UNITED STATES PATENT OFFICE 2,548,416

AMINO-ALDEHYDE CONDENSATION PRODUCTS AND PROCESSES FOR PREPARING THEM

George Barsky, New York, and Frank A. Strauss, Staten Island, N. Y.

No Drawing. Application January 14, 1949, Serial No. 71,036

5 Claims. (Cl. 260—67.6)

This invention relates to the preparation of resinous and plastic compositions of the type usually made by condensing urea or urea, and melamine, with formaldehyde. Such compositions may either be water-soluble or soluble in non-aqueous solvents. These products in the past have been prepared by reacting urea, or urea and melamine, with formaldehyde in aqueous solution with control of hydrogen ion concentration. Commercial formaldehyde is marketed in solution containing a maximum of 37% to 40% formaldehyde by weight, the balance being largely water with some methanol. If this formaldehyde solution is used as a starting material, its water content is unavoidably introduced into the reaction mixture. Paraformaldehyde, a solid polymer of formaldehyde containing no water, is available, but this constitutes an expensive source of formaldehyde and one which is not equivalent to aqueous formaldehyde solution in reactivity.

After the reaction between the urea and formaldehyde solution has taken place, it is necessary to remove all or a part of the water in order to prepare the composition for commercial use. Aqueous solutions of resins for adhesive purposes generally contain 60% to 70% solids. The water-soluble material is also sold in dry form. In the case of resins which are soluble in non-aqueous solvents, the water which is removed is replaced by an alcohol, for example butanol, a part of the alcohol entering into chemical combination with the urea-formaldehyde complex. The removal of water is an operation entailing considerable time and expense. During its evaporation, precautions must be taken to avoid excessive condensation of the resin which might render it insoluble and useless for the purpose intended. It will thus be seen that any procedure which will obviate the necessity of removing water by evaporation or reduce the amount of water which must be so removed will cheapen and simplify the process of manufacture of these resins.

Dimethylol urea, $HOCH_2NHCONHCH_2OH$, is a commercially available compound which contains in combined form the elements of both urea and formaldehyde. This compound is cheap, being offered for sale at times at a price equivalent to the cost of the component urea and formaldehyde. Its low price and its low water content (about 10% for the commercial grade) render it an attractive source of both urea and formaldehyde. These two components are present in the compound in approximately the proportions useful for resin preparation. Unfortunately, however, dimethylol urea is not a stable compound. While pure dimethylol urea is completely soluble in water, the commercial product invariably contains more or less water-insoluble residue. The water-insoluble portion probably consists of compounds of the methylene urea type, formed by the dehydration of dimethylol urea. Commercial dimethylol urea often will not dissolve completely in water, but forms a slurry containing insoluble matter in coarse or granular form. Such a product cannot be converted into commercially acceptable adhesive resin or a transparent butanol-soluble coating resin by the usual procedure applicable to urea-formaldehyde solutions, the insoluble granular matter always persisting.

We have discovered that commercial dimethylol urea containing matter normally insoluble in water can be brought completely into solution by heating with ordinary aqueous formaldehyde at a hydrogen ion concentration (pH) greater than 7.0. As little as one part 37% formaldehyde solution to three parts dimethylol urea is sufficient to effect complete solution. The aqueous formaldehyde employed may be the ordinary commercial product which normally contains up to 10% of methanol. The solution thus obtained can then be converted into a solution of a resin free from coarse insoluble matter by further heat treatment after readjusting the pH to a value less than 7.0. Before subjecting the solution to this resinification reaction, urea or melamine may be added to compensate for the additional formaldehyde content of the formaldehyde solution used as the solvent. If it is desired to make a solvent-soluble condensation product, the water contained in the solution may be removed, for example by azeotropic distillation with butanol, and condensation effected with controlled pH below 7.0. In this manner clear and transparent non-aqueous solutions of alkyd-compatible urea-formaldehyde resins may be obtained.

In carrying out this procedure the ratio of carbamide groupings to methylol groupings in the reaction mixture may be varied widely. In general useful resins will have a molecular ratio of carbamide to methylol in the finished product varying between 1:1.8 and 1:2.5.

The following are examples of the practice of this invention:

Example 1

In a kettle provided with a reflux condenser is placed 40 lbs. of 37% U. S. P. formaldehyde solution. The pH of the formaldehyde solution is then adjusted to 8.5 by the addition of 5% sodium hydroxide solution. There is then added 89 lbs. commercial dimethylol urea containing about 10% moisture and the mixture is heated to boiling under reflux until a clear solution is obtained. The time required for this will vary with the properties of the dimethylol urea used, an old lot generally requiring longer refluxing than a fresh batch. A typical grade requires twenty to thirty minutes of boiling to effect complete solution. After the dimethylol urea is completely dissolved, heating is continued for one hour additional, during which time the solution may become somewhat turbid, but no coarse precipitate is formed. Heating is then interrupted and a slurry of 20 lbs. technical urea in 14 lbs., 37% U. S. P. formaldehyde is added. After the addition of this slurry, the mixture will normally have a pH of 6.0 to 6.5. Refluxing is then resumed and after one hour or less the solution again becomes clear. Refluxing is continued until a sample withdrawn shows the desired viscosity. The time necessary to attain a given viscosity will vary with the characteristics of the dimethylol urea used. A typical lot required 3.5 hours of refluxing after addition of the urea-formaldehyde slurry to attain a viscosity of 15 to 20 poises, which is a suitable value for an adhesive grade of syrup. When the desired viscosity is reached, the pH of the solution is adjusted to 7.0 to 7.5 by the addition of sodium hydroxide solution. The reaction mixture is then withdrawn from the kettle and rapidly cooled. The resulting product has a non-volatile content of 68.5%. When freshly prepared it is clear, and transparent. Like most syrups prepared from urea and formaldehyde, it becomes opalescent after standing for about forty-eight hours. Even after long ageing, however, no coarsely granular solid material separates.

A resin syrup prepared in this manner exhibits characteristics similar to those of syrups prepared from urea and formaldehyde in corresponding proportions in aqueous solution and subsequently concentrated to 65% to 70% solids by evaporation. It responds normally to the usual catalyst and may be used in the customary manner for plywood or paper lamination.

In the preparation of resins by this method, it is essential that the formaldehyde used be alkaline initially in order to effect complete solution of the dimethylol urea. After solution has been attained however, resinification proceeds very slowly if at all when the pH is greater than 7.0. There is always a tendency for the pH to drift lower during refluxing, and this tendency is favorable to the promotion of resinification. In the example above, the addition of more formaldehyde, which is normally acid, after the solution of the dimethylol urea helps to lower the pH and furnishes the necessary catalytic acceleration. It is however, not essential to add formaldehyde in two stages as cited in the above example. If all of the formaldehyde has been added in the beginning, pH may be lowered at the time of the urea addition by means of dilute acid or acid-reacting catalysts.

A convenient way to effect the necessary reduction of pH automatically during the processing of the resin is with the aid of ammonium salts. If an ammonium salt is added to the reaction mixture, the ammonium ion in solution is gradually fixed by reaction with formaldehyde and converted into non-ionized compounds. This results in the accumulation of anions and the solution assumes an acid reaction. If the formaldehyde is originally made alkaline by the addition of ammonium hydroxide instead of sodium hydroxide, ammonium salts are formed by reaction with the formic or other acids always present in commercial formaldehyde solutions. Such formaldehyde will gradually resume its original acid reaction upon standing or heating. This effect is accelerated by the presence of a small amount of ammonium chloride which can be formed in solution by adding hydrochloric acid to the formaldehyde prior to making it alkaline with ammonium hydroxide. The following is an example of a resin prepared from dimethylol urea with automatic control of pH with the aid of ammonium salts.

*Example 2*

Thirty-five lbs. U. S. P. 37% formaldehyde is brought to pH 2.5 by the addition of 0.5 N hydrochloric acid, about 0.3 lb. of acid solution being required. The pH is then brought to 8.0–8.5 by the addition of 28% ammonium hydroxide solution, about 0.2 lb. solution being needed. There are then added 100 lbs. dimethylol urea and the mixture is refluxed for one hour. At the end of this time an opalescent solution results, the dimethylol urea having dissolved substantially completely. There is then added a slurry of 17.4 lbs. technical urea in 12 lbs. U. S. P. 37% formaldehyde. The mixture is then refluxed for four hours. At the end of this period it has a pH of 5.5–6.0, a solids content of approximately 70% and a viscosity of 10 poises at 77° F. The pH is then adjusted to 7.0 by the addition of 5% sodium hydroxide solution. Adjustment to this pH gives greater stability on storage. The resultant resin syrup is clear when freshly prepared but becomes opalescent on standing for about twenty-four hours. It may be kept for at least several months under ordinary conditions without deterioration, showing no excessive increase in viscosity or separation of granular material. It is suitable for use as an adhesive for plywood lamination with acid catalysts in the usual manner.

The examples cited above describe the preparation of aqueous resin syrups containing about 70% solids and comparable in every respect with the usual aqueous urea formaldehyde syrups. For coating purposes non-aqueous resin solutions are required. In the preparation of such resins the following method gives satisfactory results:

A mixture of dimethylol urea and 37% aqueous formaldehyde is made ammoniacal. A small amount of normal butanol may be added and the mixture is boiled under reflux until the dimethylol urea is substantially dissolved. The resultant solution may be turbid but is always free from coarse or granular matter. Urea is then added to the solution and refluxing is continued. Butanol may be added at this point. The mixture is then made acid, preferably with an organic acid such as oxalic, more butanol is added, and the mixture again heated to boiling and maintained at reflux until it becomes clear. The reaction mixture is then distilled. The distillate initially is an azeotropic mixture of butanol and water which separates into two layers. The upper butanol-rich layer is returned to the still after separation from the lower aqueous layer. The volume of liquid in the still is maintained approximately constant by the addition of sufficient butanol to make up the distillate removed. In this way dehydration is effected. After most of the water has been removed, the distillate is no longer returned to the still but anhydrous butanol is added as required to maintain the material in the still in a fluid condition. Distillation is continued until the distillate is substantially anhydrous as shown by its ability to mix with xylol without turbidity. The non-volatile content of the resin solution in the still is then adjusted to the value desired by the addition or removal of butanol, or by the addition of solvents other than butanol. Commercial urea-formaldehyde coating resin solutions frequently contain xylol, and a solution having 50% solids, 30% butanol and 20% xylol is a common type. Other primary or secondary saturated aliphatic alcohols varying in carbon content from $C_3$ to $C_8$ may be substituted in whole or in part for butanol in preparing resins of this type. Examples of such alcohols are isobutanol, pentanol and octanol.

Solutions prepared in the manner described are nearly water white viscous liquids which show not more than a slight haze. This haze if present is readily removed by filtration, giving a brilliantly clear product. The solutions are compatible with the usual alkyd resin solutions used for modifying purposes, and when so modified yield coatings having highly desirable properties.

The following is an example of a resin solution prepared in this manner.

*Example 3*

The following charge is placed in a stainless steel kettle having a capacity of about 125 gallons and provided with the necessary piping and condenser:

37.2 kg. U. S. P. 37% formaldehyde
6 liters 28% ammonium hydroxide solution
30 liters butanol
120 kg. commercial dimethylol urea The mixture is heated to boiling with reflux for about one hour. At the end of this time the solution is slightly turbid but free from coarse or granular matter. There is then added 9 kg. urea. Refluxing is continued for an additional hour. One hundred liters butanol is then added, the mixture is brought to boiling again and 6 liters 6.5% aqueous oxalic acid solution and 14 liters butanol are added. The mixture is then refluxed for thirty minutes. At the end of this time it is clear. There is then added 30 liters butanol. Refluxing is continued for about ten minutes, after which time the reflux condenser is removed and the mixture is distilled, butanol being added continuously during distillation to keep the volume in the kettle approximately constant. In this manner 270 liters of distillate is removed. On cooling, this separates into two phases; about 210 liters of a butanol-rich phase and 60 liters of a water-rich phase. During this distillation the distillate removed from the flask has been replaced by 270 liters of recovered water-saturated butanol obtained by the separation of the water phase from the butanol phase of the distillate recovered in this and previous runs. When the distillate begins to come over as a single phase without the separation of a water layer, 30 liters of fresh anhydrous butanol is added to the kettle and 120 liters of additional distillate is removed. At the end of this period the distillate mixes with xylol without turbidity, showing that the reaction mixture is anhydrous. Heating is then discontinued and the resin solution is removed from the kettle. The yield is 230 kg. of solution containing approximately 148 kg. of non-volatile matter. The solution is then thinned with butanol and xylol to give a product having 50% solids, 30% butanol and 20% xylol which is slightly hazy and has a viscosity of about 2 poises at 77° F. Filtration yields a brilliantly clear product. The molecular ratio of urea to formaldehyde used in this resin is approximately 1:2.12.

For use as coating resins the addition of acid catalyst to the solution is desirable to accelerate cure. A suitable addition is 0.67% phthalic acid based on resin content. After such addition, cast films of the resin baked at 225–250° F. show an extremely hard glassy surface and are brittle. The solution is compatible with medium and long-oil alkyd resin solutions in aromatic solvents in proportions up to equal parts of urea resin and alkyd resin solids. Films cast from such mixtures show good surface hardness and flexibility after baking, and yield coatings at least equal in quality to the standard commercially available products.

For some purposes it is desirable to have a resin solution of higher viscosity than that described in Example 3. This increased viscosity may be obtained by continuing to heat the solution after dehydration. The further addition of acid catalyst, for example oxalic acid in butanol solution, during the heating will accelerate the increase in viscosity.

The viscosity of the finished product is also dependent on the ratio of urea to formaldehyde. An increase in the proportion of formaldehyde used promotes an increase in viscosity and is also sometimes desirable in order to increase the compatability and stability of the product. The following is an example of the preparation of a resin employing a molecular ratio of urea to formaldehyde of 1:2.24.

*Example 4*

A mixture of:

35.2 kg. 37% formaldehyde
6 liters 28% ammonium hydroxide solution
82.5 kg. commercial dimethylol urea is refluxed for one hour. Ten kilograms technical urea is then added, and the mixture is refluxed again for forty minutes. There is then added 80 liters butanol. The mixture is brought to a boil and there is added to the two-phase system with vigorous agitation a mixture of 40 liters butanol and 4.5 liters 6.5% aqueous oxalic acid solution. Agitation with reflux is continued for ten minutes. A clear single phase results. There is then added 30 liters butanol. The mixture is then dehydrated by distillation, the butanol layer of the cool distillate being returned continuously to the kettle after removal of the water layer. After a total of about 57.5 liters of water layer has been removed in this manner the distillate comes over in a single phase. Return of the distillate to the kettle is then discontinued. Thirty liters of fresh butanol is added to the kettle while distillation proceeds and 50 liters of solvent is removed by continuing the distillation. At this point the distillate tests anhydrous on mixing with the xylol. Distillation is then interrupted and the mixture is thinned with butanol and xylol to give a product containing 50% solids, 30% butanol and 20% xylol. To this is added 0.67% phthalic acid based on non-volatile content. The resultant solution is clear and has a viscosity of 9 poises at 77° F. It is quite stable on storage and compatible with medium and long oil alkyds, and such mixtures yield films having very desirable qualities.

Various modifications in details may obviously be made in the procedure disclosed in the foregoing specifications. Thus other reactive polyamino compounds, such as melamine, may be substituted for all or part of the urea added after the dimethylol urea has been dissolved. If melamine is substituted for urea, compositions of superior water resistance are obtained. In general, one mole of urea may be replaced by two-thirds of a mole of melamine to obtain a product having an equivalent ratio of methylol to amino groups.

In another variation of the described procedure, dehydration of aqueous solutions may be effected by distillation in the presence of volatile liquids other than alcohols, for example xylol. Other soluble resins, for example alkyd resins, may be added to the solution during the course of the dehydration. These and other variations may be practiced without departing from the spirit of the invention.

What we claim is:

1. A process for preparing water-soluble resinous compositions which consists in heating dimethylol urea until substantially complete solution is effected with at least one-seventh of its weight of formaldehyde dissolved in water and having an initial pH value greater than 7.0, then adding urea to said solution in such proportion that the molecular ratio of carbamide groupings to methylol groupings present is not less than 1:2.5 and not greater than 1:1.8 and continuing heating at a pH value less than 7.0 until a resinous product is obtained.

2. A process for preparing water-soluble resinous compositions which consists in heating dimethylol urea until substantially complete solution is effected with at least one-seventh of its weight of formaldehyde dissolved in water and having an initial pH value greater than 7.0, then adding a polyamino compound chosen from the class of urea and melamine to said solution in such proportions that the molecular ratio of amino groupings to methylol groupings is not less than 1:1.25 and not greater than 1:0.9 and continuing heating at a pH value less than 7.0 until a resinous product is obtained.

3. A process for preparing water-soluble resinous compositions which consists in heating dimethylol urea until susbtantially complete solution is effected with at least one-seventh of its weight of formaldehyde dissolved in water and brought to a pH value greater than 7.0 by the addition of ammonium hydroxide prior to the addition of the dimethylol urea, then, subsequent to the solution of said dimethylol urea, adding urea in such proportion that the molecular ratio of carbamide groupings to methylol groupings present is not less than 1:2.5 and not greater than 1:1.8 and continuing heating until a resinous product is formed.

4. The process of producing an aqueous solution capable of conversion into a non-aqueous solution of a resinous composition which consists in heating dimethylol urea until substantially complete solution is effected with at least one-seventh of its weight of formaldehyde dissolved in water and having an initial pH value greater than 7.0 and then dissolving urea in said solution in such proportion that the molecular ratio of carbamide groupings to methylol groupings present is not less than 1:2.5 and not greater than 1:1.8.

5. The process of producing an aqueous solution capable of conversion into a non-aqueous solution of a resinous composition which consists in heating dimethylol urea until substantially complete solution is effected with at least one-seventh of its weight of formaldehyde dissolved in water and having an initial pH greater than 7.0 and then dissolving a polyamino compound taken from the class of urea and melamine in said solution in such proportion that the molecular ratio of amino groupings to methylol groupings present is not less than 1:1.25 and not greater than 1:0.9.

GEORGE BARSKY.
FRANK A. STRAUSS.

REFERENCES CITED

The following references are of record in the file of this patent:

UNITED STATES PATENTS

| Number | Name | Date |
| --- | --- | --- |
| 1,676,543 | Gams | July 10, 1928 |
| 2,088,036 | Saunders | July 17, 1937 |
| 2,192,129 | Ellis | Feb. 27, 1940 |
| 2,230,121 | Pollak | Jan. 28, 1941 |
| 2,324,417 | Murray et al. | July 13, 1943 |
| 2,351,602 | D'Alelio | June 20, 1944 |
| 2,432,148 | Furness et al. | Dec. 9, 1947 |
| 2,432,544 | Rhodes | Dec. 16, 1947 |
| 2,436,355 | Cadot et al. | Feb. 17, 1948 |